US012584617B2

(12) United States Patent
Garber

(10) Patent No.: US 12,584,617 B2
(45) **Date of Patent: *Mar. 24, 2026**

(54) ADJUSTABLE POSITION LIGHT EMITTING APPARATUS AND SYSTEM

(71) Applicant: EmeryAllen, LLC, Mt. Pleasant, SC (US)

(72) Inventor: Thomas Garber, Daniel Island, SC (US)

(73) Assignee: EmeryAllen, LLC, Mt. Pleasant, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 19/076,279

(22) Filed: Mar. 11, 2025

(65) Prior Publication Data

US 2025/0271126 A1 Aug. 28, 2025

Related U.S. Application Data

(63) Continuation of application No. 18/598,953, filed on Mar. 7, 2024, now Pat. No. 12,247,725, which is a continuation-in-part of application No. 18/204,284, filed on May 31, 2023, now Pat. No. 11,953,186, which is a continuation-in-part of application No. 29/859,862, filed on Nov. 14, 2022, now Pat. No. Des. 1,059,656.

(60) Provisional application No. 63/389,817, filed on Jul. 15, 2022.

(51) Int. Cl.

| | |
|---|---|
| ***F21V 21/30*** | (2006.01) |
| ***F21S 8/08*** | (2006.01) |
| ***F21V 23/00*** | (2015.01) |
| ***F21W 131/10*** | (2006.01) |
| ***F21Y 115/10*** | (2016.01) |
| ***H05B 45/10*** | (2020.01) |

(52) U.S. Cl.

CPC ............ *F21V 21/30* (2013.01); *F21V 23/006* (2013.01); *H05B 45/10* (2020.01); *F21S 8/081* (2013.01); *F21W 2131/10* (2013.01); *F21Y 2115/10* (2016.08)

(58) Field of Classification Search

CPC ....... F21V 21/30; F21S 8/081; F21W 2131/10

See application file for complete search history.

(56) References Cited

U.S. PATENT DOCUMENTS

| | | | | |
|---|---|---|---|---|
| 9,310,059 | B2 * | 4/2016 | Zhang | F21S 10/06 |
| 10,132,480 | B2 * | 11/2018 | Ghasabi | F21S 8/081 |
| 10,440,308 | B2 * | 10/2019 | Xi | F21V 9/08 |
| 10,746,382 | B2 * | 8/2020 | Mullen | F21V 21/0824 |
| 10,941,924 | B2 * | 3/2021 | Yu | F21V 17/12 |

(Continued)

*Primary Examiner* — William N Harris

(74) *Attorney, Agent, or Firm* — Gregory Finch; Finch Paolino, LLC

(57) ABSTRACT

Embodiments of the present disclosure provide for a light emitting apparatus comprising a housing portion that is rotatably coupled to a base portion, wherein the housing portion is adjustable on two axes of rotation. In certain embodiments, the housing portion may be selectively disconnected from the base portion. The light emitting apparatus may comprise at least one LED operably engaged with at least one LED driver and a potentiometer to enable a selectively variable lumen output. In accordance with certain embodiments, the housing portion comprises at least one lens portion configured to enable one or more interchangeable/modifiable beam spread optics.

20 Claims, 11 Drawing Sheets

(56) References Cited

U.S. PATENT DOCUMENTS

| | | | | |
|---|---|---|---|---|
| 11,466,844 | B1 * | 10/2022 | Groat | F21V 21/14 |
| 11,493,181 | B2 * | 11/2022 | Zheng | F21S 10/007 |
| 2009/0185377 | A1 * | 7/2009 | Johnson | G02B 26/0808<br>362/259 |
| 2011/0002122 | A1 * | 1/2011 | Tsao | F21S 8/033<br>362/277 |

* cited by examiner

ADJUSTABLE POSITION LIGHT EMITTING APPARATUS AND SYSTEM

CROSS-REFERENCE TO RELATED APPLICATIONS

The present application is a continuation of U.S. patent application Ser. No. 18/598,953 filed Mar. 7, 2024, which is a continuation-in-part of U.S. patent application Ser. No. 18/204,284 filed May 31, 2023, which application is a continuation-in-part of U.S. design application Ser. No. 29/859,862 filed Nov. 14, 2022 and entitled "MINIATURE LANDSCAPE LAMP"; and further claims priority benefit of U.S. provisional application No. 63/389,817 filed Jul. 15, 2022; the entireties of each of which are incorporated herein at least by virtue of this reference.

FIELD

The present disclosure relates to the field of light emitting diode (LED) lamps; in particular, a light emitting apparatus and system comprising an adjustable optical axis and variable lumen output.

BACKGROUND

Landscape lights or outdoor lights are used in landscapes and other exterior applications to illuminate different elements of a landscape, such as plants or other structures, and/or different exterior elements such as paths and stairs. Landscape lights can be installed indoors or outdoors in different substrates such as loose, unpaved earth, concrete, stone, or wood. Some landscape light designs include a light generating module connected to a support. The support secures the landscape light to a substrate. Given the variety of exterior illumination applications in which landscape lights are used, landscape lighting apparatuses and systems must be both durable and versatile to withstand prolonged exposure to environmental elements and enable ease of installation and deployment over a wide range of substrates.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Certain aspects of the present disclosure provide for a light emitting apparatus comprising a base portion comprising a lower surface defining a circumference of the base portion, an upper surface and a retaining member extending perpendicularly from the upper surface of the base portion, the retaining member comprising a first planar surface; a cylindrical housing comprising a bottom surface and a side wall defining an exterior surface and an interior area, the cylindrical housing comprising a recessed portion disposed on an arc of the bottom surface and the side wall, the recessed portion comprising a second planar surface, wherein the base portion and the cylindrical housing are configured to be selectively interfaced such that the first planar surface of the retaining member is interfaced with the second planar surface of the recessed portion; a retaining screw extending through an aperture of the retaining member and configured to selectively secure the cylindrical housing to the base portion, wherein the cylindrical housing is configured to rotate around an axis of the retaining screw, wherein the retaining screw is configured to selectively retain the cylindrical housing to the retaining member at an angle between 0 degrees and at least 90 degrees relative to the upper surface of the base portion; at least one LED housed in the interior area of the cylindrical housing; an electronics assembly housed in the interior area of the cylindrical housing and operably engaged with the at least one LED, the electronics assembly comprising an LED driver configured to provide a flow of power between a power supply and the at least one LED; a lens positioned above the at least one LED; and a cover portion coupled to an upper circumference of the cylindrical housing and configured to secure the lens to the cylindrical housing.

In accordance with certain embodiments of the light emitting apparatus of the present disclosure, the bottom surface of the cylindrical housing is in direct contact with the upper surface of the base portion when the cylindrical housing is positioned at 0 degrees. The cylindrical housing may comprise a circumference that is the same as the circumference of the base portion. The base portion may comprise at least one slotted aperture configured to retain at least one screw. The at least one slotted aperture may be curved such that the base portion can be rotated around the at least one screw between at least one first angle and at least one second angle. The recessed portion of the cylindrical housing may be configured to receive the retaining member of the base portion. In certain embodiments, the retaining member may extend perpendicularly from the upper surface of the base portion at a point along the circumference of the base portion. In certain embodiments, the base portion may comprise a circular aperture configured to receive a landscape spike.

Further aspects of the present disclosure provide for a light emitting apparatus comprising a cylindrical housing comprising at least one LED light assembly housed in an interior area of the cylindrical housing; a cylindrical base portion comprising a retaining member extending from an upper surface of the cylindrical base portion, wherein the cylindrical housing comprises a recessed portion extending from a bottom surface of the cylindrical housing, wherein the cylindrical housing is configured to be selectively interfaced with the cylindrical base portion such that the bottom surface of the cylindrical housing is in direct contact with the upper surface of the cylindrical base portion, wherein the recessed portion of the cylindrical housing is configured to receive the retaining member of the cylindrical base portion when the cylindrical housing is selectively interfaced with the cylindrical base portion; and a retaining screw extending through an aperture of the retaining member and interfaced with a surface of the recessed portion to selectively secure the cylindrical housing to the cylindrical base portion, wherein the cylindrical housing is configured to rotate around an axis of the retaining screw.

In accordance with certain embodiments of the light emitting apparatus of the present disclosure, the retaining member comprises a first planar surface that is perpendicular to the upper surface of the cylindrical base portion. In said embodiments, the recessed portion may comprise a second planar surface that is perpendicular to the bottom surface of the cylindrical housing. In said embodiments, the first planar surface of the retaining member may be interfaced with the second planar surface of the recessed portion when the cylindrical housing is selectively interfaced with the cylindrical base portion. In certain embodiments, the cylindrical housing may comprise a circumference that is the same as a circumference of the cylindrical base portion. In certain embodiments, the retaining screw is configured to selectively retain the cylindrical housing to the retaining member at an angle between 0 degrees and at least 90 degrees relative to the upper surface of the cylindrical base portion.

Still further aspects of the present disclosure provide for an exterior lighting system comprising a base portion comprising a lower surface defining a circumference of the base portion, an upper surface and a retaining member extending perpendicularly from the upper surface of the base portion; a cylindrical housing comprising a bottom surface and a side wall defining an exterior surface and an interior area, the cylindrical housing comprising a recessed portion disposed on the side wall of the cylindrical housing and extending from the bottom surface of the cylindrical housing, wherein the cylindrical housing is configured to be selectively interfaced with the base portion, wherein the recessed portion of the cylindrical housing is configured to receive the retaining member of the base portion when the cylindrical housing is selectively interfaced with the base portion; a retaining screw extending through an aperture of the retaining member and interfaced with a surface of the recessed portion to selectively secure the cylindrical housing to the cylindrical base portion, wherein the cylindrical housing is configured to rotate around an axis of the retaining screw; at least one LED housed in the interior area of the cylindrical housing; an electronics assembly housed in the interior area of the cylindrical housing and operably engaged with the at least one LED, the electronics assembly comprising an LED driver configured to provide a flow of power between a power supply and the at least one LED; a lens positioned above the at least one LED; and a cover portion coupled to an upper circumference of the cylindrical housing and configured to secure the lens to the cylindrical housing.

In accordance with certain embodiments, the exterior lighting system may further comprise an elongated member selectively coupled to the lower surface of the base portion. In certain embodiments, the retaining screw may be configured to selectively retain the cylindrical housing to the retaining member at an angle between 0 degrees and at least 90 degrees relative to the upper surface of the base portion. The retaining member may comprise a first planar surface that is perpendicular to the upper surface of the cylindrical base portion. In said embodiments, the recessed portion may comprise a second planar surface that is perpendicular to the bottom surface of the cylindrical housing. In said embodiments, the first planar surface of the retaining member may be interfaced with the second planar surface of the recessed portion when the cylindrical housing is selectively interfaced with the base portion.

Still further aspects of the present disclosure provide for a lighting fixture comprising a base portion comprising a lower surface defining a circumference of the base portion, an upper surface and a retaining member extending from the upper surface of the base portion; a housing comprising a bottom surface and a side wall defining an exterior surface and an interior area; and a retaining screw extending through an aperture of the retaining member and configured to selectively secure the housing to the base portion, wherein the housing is configured to rotate around an axis of the retaining screw, wherein the retaining screw is configured to selectively retain the housing to the retaining member at an angle between 0 degrees and at least 90 degrees relative to the upper surface of the base portion, wherein the bottom surface of the housing is in direct contact with the upper surface of the base portion when the housing is positioned at 0 degrees.

In accordance with certain embodiments, the lighting fixture may further comprise at least one LED housed in the interior area of the housing. In certain embodiments, the lighting fixture may further comprise an electronics assembly housed in the interior area of the housing and operably engaged with the at least one LED, the electronics assembly comprising an LED driver configured to provide a flow of power between a power supply and the at least one LED. The electronics assembly may further comprise a potentiometer. The potentiometer may be operably configured to control a variable lumen output of the at least one LED. In certain embodiments, the potentiometer is selectively configurable by a user (e.g., via a mechanical interface such as a screw) to configure the variable lumen output of the at least one LED. In certain embodiments, the potentiometer is housed in the interior area of the housing.

Still further aspects of the present disclosure provide for a lighting fixture comprising a housing comprising an LED lighting assembly housed in an interior area of the housing, wherein the LED lighting assembly comprises at least one LED and an LED driver configured to provide a flow of power between a power supply and the at least one LED; a base portion comprising a retaining member extending from an upper surface of the base portion; and a retaining screw extending through an aperture of the retaining member and interfaced with a surface of the housing, wherein the housing is configured to be selectively interfaced with the base portion such that a bottom surface of the housing is in direct contact with the upper surface of the base portion when the housing is positioned at 0 degrees.

Still further aspects of the present disclosure provide for a lighting fixture comprising a base portion comprising a lower surface defining a circumference of the base portion, an upper surface and a retaining member extending from the upper surface; a housing comprising a bottom surface and a side wall defining an exterior surface and an interior area; a retaining screw extending through an aperture of the retaining member and interfaced with a portion of the exterior surface of the housing, wherein the housing is configured to be selectively interfaced with the base portion such that the bottom surface of the housing is in direct contact with the upper surface of the base portion when the housing is positioned at 0 degrees; at least one LED housed in the interior area of the housing; and an electronics assembly housed in the interior area of the housing and operably engaged with the at least one LED, the electronics assembly comprising an LED driver configured to provide a flow of power between a power supply and the at least one LED.

The foregoing has outlined rather broadly the more pertinent and important features of the present invention so that the detailed description of the invention that follows may be better understood and so that the present contribution to the art can be more fully appreciated.

BRIEF DESCRIPTION OF DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which.

DETAILED DESCRIPTION

Figure 1:
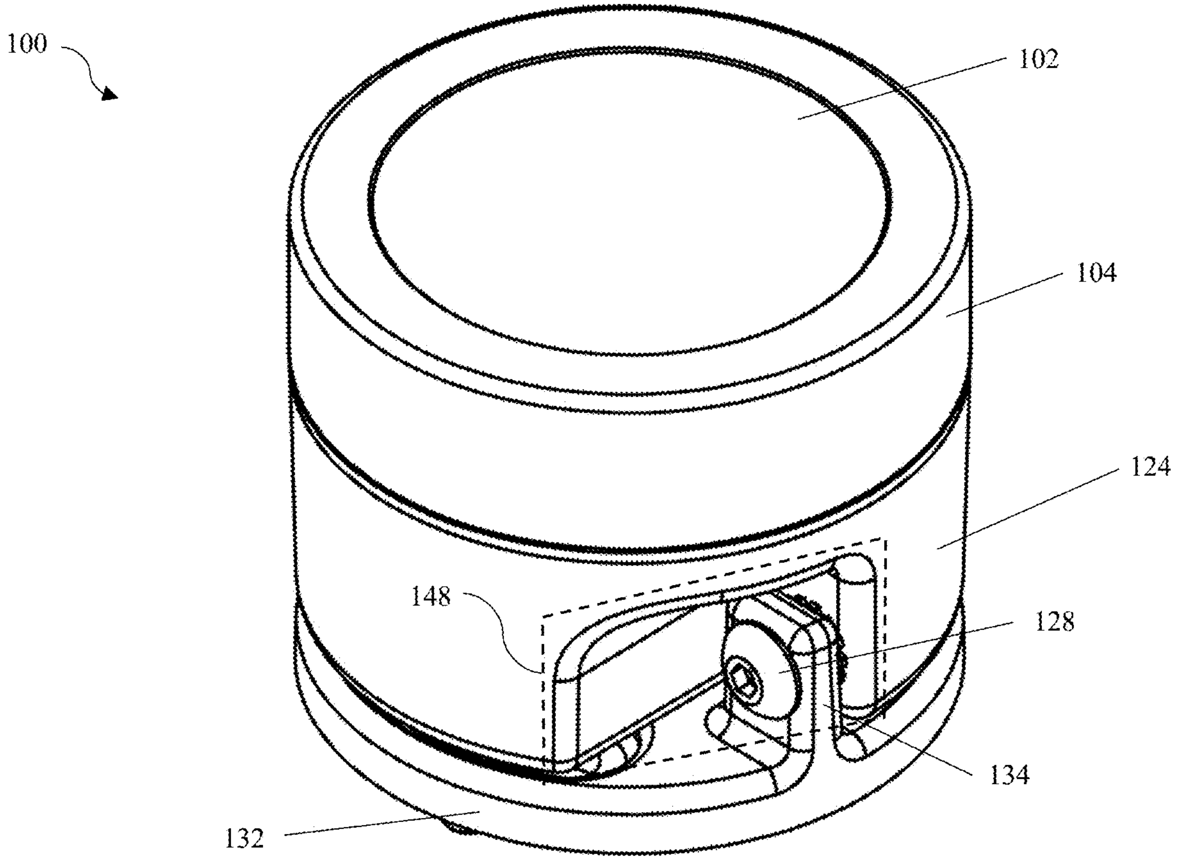
FIG. 1 is a perspective view of an adjustable light emitting apparatus, in accordance with certain aspects of the present disclosure.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout. All definitions, as defined and used herein, should be understood to control over dictionary definitions, definitions in documents incorporated by reference, and/or ordinary meanings of the defined terms.

Following below are more detailed descriptions of various concepts related to, and embodiments of, inventive methods, devices and systems configured to provide for a lighting fixture comprising a base portion comprising a lower surface defining a circumference of the base portion, an upper surface and a retaining member extending from the upper surface; a housing comprising a bottom surface and a side wall defining an exterior surface and an interior area; a retaining screw extending through an aperture of the retaining member and interfaced with a portion of the exterior surface of the housing, wherein the housing is configured to be selectively interfaced with the base portion such that the bottom surface of the housing is in direct contact with the upper surface of the base portion when the housing is positioned at 0 degrees; at least one LED housed in the interior area of the housing; and an electronics assembly housed in the interior area of the housing and operably engaged with the at least one LED, the electronics assembly comprising an LED driver configured to provide a flow of power between a power supply and the at least one LED and a potentiometer operably engaged with the LED driver to control a variable lumen output (i.e., brightness) for the at least one LED.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "interface" means any shared boundary or connection between two dissimilar objects, devices or systems through which information or power is passed and/or a mechanical, functional and/or operational relationship is established and/or accomplished. Such shared boundary or connection may be physical, electrical, logical and/or combinations thereof.

As used herein, the term "LED" refers to any type of light source comprising a light-emitting diode. A light-emitting diode is a semiconductor light source that emits light when current flows through it.

Certain benefits and advantages of the present disclosure include a light emitting apparatus comprising a housing that is rotatably coupled to a base portion, wherein the housing is rotatably adjustable on two axes of rotation.

Further benefits and advantages of the present disclosure include a light emitting apparatus comprising a housing portion that is rotatably coupled to a base portion, wherein the housing portion may be selectively disconnected from the base.

Further benefits and advantages of the present disclosure include a light emitting apparatus comprising a housing portion that is rotatably coupled to a base portion, wherein the housing portion comprises at least one LED operably engaged with at least one LED driver to have a variable lumen output.

Further benefits and advantages of the present disclosure include a light emitting apparatus comprising a housing portion that is rotatably coupled to a base portion, wherein the housing portion comprises at least one lens portion configured to enable one or more interchangeable/modifiable beam spread optics.

Figure 2:
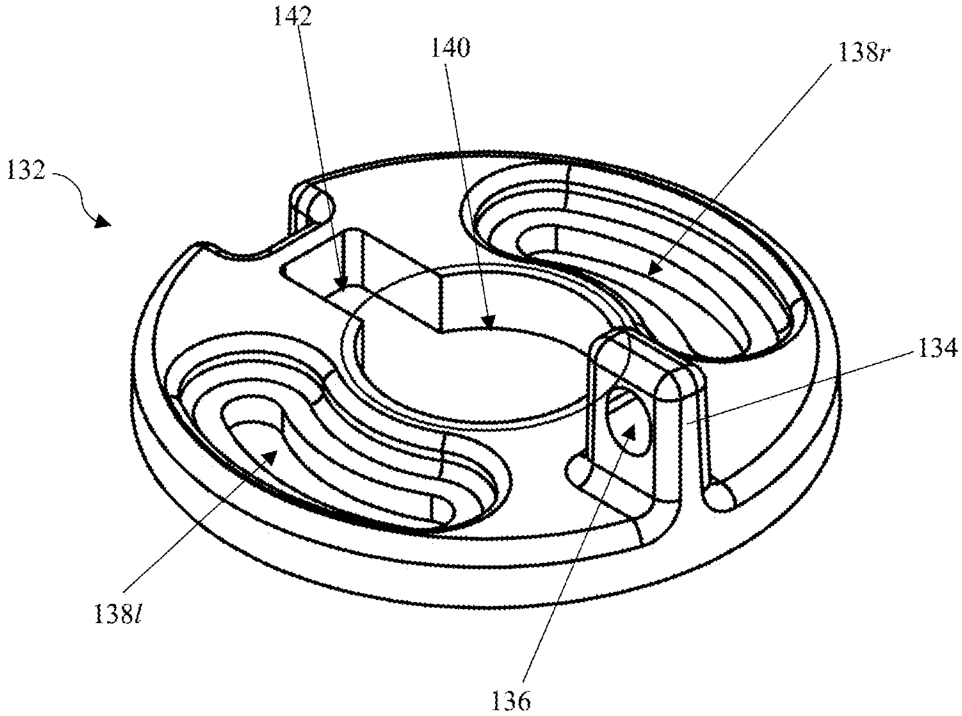
FIG. 2 is a perspective view of a base portion of the adjustable light emitting apparatus, in accordance with certain aspects of the present disclosure.

Turning now descriptively to the drawings, in which similar reference characters denote similar elements throughout the several views, FIG. 1 depicts a perspective view of an adjustable light emitting apparatus 100. In accordance with certain aspects of the present disclosure, apparatus 100 may embody an exterior lighting fixture configured to enable one or more outdoor lighting use cases. In accordance with certain aspects of the present disclosure, apparatus 100 comprises a base 132, a housing 124, a cover portion 104 and a glass cover 102. In accordance with certain embodiments, apparatus 100 may be configured as a "hockey puck" shape when a bottom surface of housing 124 is selectively interfaced with an upper surface of base 132 (e.g., substantially cylindrical). Housing 124 may comprise a recessed portion 148 disposed along a side wall of housing 124. Recessed portion 148 may comprise at least one vertical (i.e., planar) side wall extending from a bottom surface of housing 124. In accordance with certain aspects of the present disclosure, housing 124 may be selectively coupled to base 132 at a retaining member 134 of base 132 via an axis screw 128. Retaining member 134 may be configured to interface with recessed portion 148 of housing 124 such that a planar surface of retaining member 134 may be in contact with the at least one vertical (i.e., planar) side wall of recessed portion 148. In certain embodiments, housing 124 may be rotated around axis screw 128 and positioned at a desired angle relative to base 132; e.g., rotatably pivoted to enable a "clam-shell-type" movement around an axis. Axis screw 128 may be tightened to secure housing 124 to retaining member 134 and secure housing 124 at the desired angle relative to base 132. As shown in FIG. 2, base 132 and housing 124 may be configured to enable an optical axis of a visible light output from apparatus 100 to be directed in multiple directions (e.g., up, down, left and right). In accordance with certain embodiments, base 132 may comprise retaining member 134, an axis screw aperture 136 extending through retaining member 134, a left base screw channel 138/and a right base screw channel 138*r*, ground stake connector aperture 140 and a power cord aperture 142.

In accordance with certain embodiments, retaining member 134 may extend vertically (e.g., perpendicularly from an upper surface) of base 132. Axis screw aperture 136 may be smooth (i.e., not threaded) such that axis screw 128 (as shown in FIG. 1) may rotate freely when selectively interfaced with axis screw aperture 136 to enable selective positioning of housing 124 (as shown in FIG. 1). Left base screw channel 138/and right base screw channel 138*r* may be disposed along an arc of an area of base 132. Left base screw channel 138/and right base screw channel 138*r* may be positioned opposite from each other (e.g., a right side and a left side). In accordance with certain embodiments, left base screw channel 138/and right base screw channel 138*r* may each be configured to comprise a 45-degree arc. Left base screw channel 1381 and right base screw channel 138*r* may each comprise an aperture portion extending all the way through base 132 and a channel portion extending from an upper surface of base 132 and terminating at the aperture portion. The aperture portion may be configured to receive a screw therethrough and the channel portion may be configured to recess a head of the screw received at the aperture portion such that the screw head fits flush or below the upper surface with base 132 when the screw is interfaced with the aperture portion. Ground stake connector aperture 140 may comprise a circular aperture extending through base 132 and may be configured to mateably interface with a cylindrical member (i.e., ground stake, a landscape spike or other member configured to selectively interface with base 132). Ground stake connector aperture 140 may comprise a threaded portion for receiving a compatible threaded portion of a cylindrical member. Ground stake connector aperture 140 may be configured as any suitable shape for selectively establishing a male/female interface with a secondary member. Power cord aperture 142 may comprise a slotted aperture configured to route a power cord to housing 124 (shown in FIG. 1).

Figure 3:
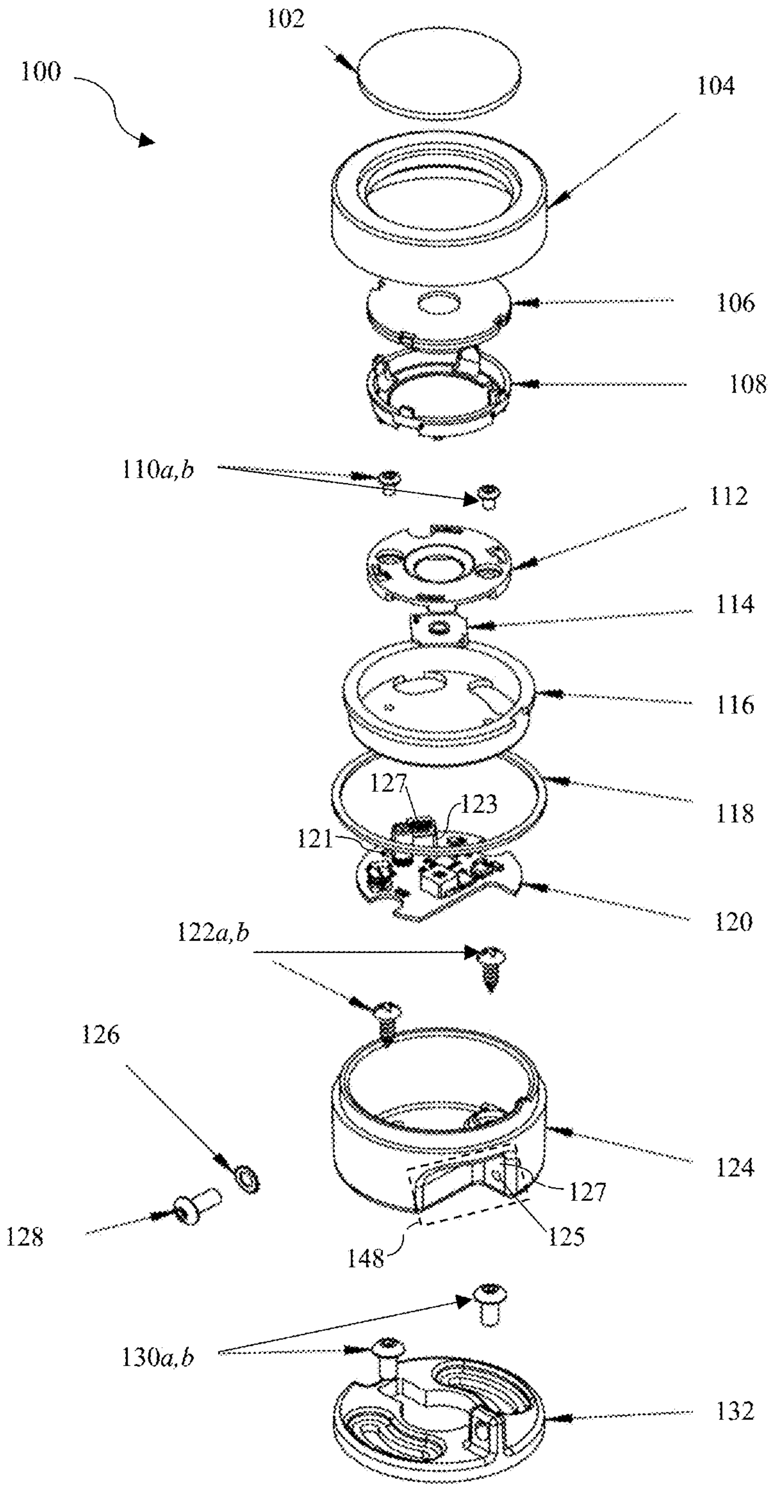
FIG. 3 is an exploded view of the adjustable light emitting apparatus, in accordance with certain aspects of the present disclosure.

Referring now to FIG. 3, an exploded view of the adjustable light emitting apparatus 100 is shown. In accordance with certain aspects of the present disclosure, an assembly of apparatus 100 may comprise elements 102-132. In accordance with certain embodiments of the present disclosure, apparatus 100 may comprise base 132 and base screws 130*a,b*. Base screws 130*a,b* may be configured to interface with left base screw channel 138*l* and right base screw channel 138*r* (as labeled in FIG. 2) in order to secure base 132 to a target surface. Apparatus 100 may further comprise housing 124. Housing 124 may comprise a bottom surface and side walls defining an open top and an interior portion. Housing 124 may comprise a recessed portion 148 configured to receive and be selectively interfaced with the retaining member 134 (as labeled in FIG. 2). Housing 124 may comprise a screw aperture 125 disposed on a side wall 127 within the recessed portion. Axis screw 128 may extend through the axis screw aperture 136 (as labeled in FIG. 2) of the retaining member 134 (as labeled in FIG. 2) and interface with screw aperture 125 disposed on side wall 127 within the recessed portion 148 of housing 124. In accordance with certain embodiments, axis screw 128 may be selectively loosened/tightened in order to selectively position housing 124 and selectively retain housing 124 at a desired angle relative to base 132. Washer 126 may improve the interface between retaining member 134 and side wall 127 and may enhance the interface between axis screw 128 and axis screw aperture 136.

Apparatus 100 may further comprise an electronics assembly 120 comprising an LED driver 121 configured to provide a flow of power to at least one LED 114. In certain embodiments, the LED driver 121 may be configured to enable a variable lumen output for at least one LED 114. In certain embodiments, electronics assembly 120 may comprise a potentiometer 123 operably engaged with LED driver 121 to configure the variable lumen output for at least one LED 114. Potentiometer 123 may comprise a variable resistor component comprising an adjustable voltage divider configured to regulate a flow of power to at least one LED 114. Potentiometer 123 may comprise a mechanical interface 127 (e.g., a screw or a switch configured to engage a moveable wiper) that is configured to enable a user of apparatus 100 to adjust a voltage resistance in order to modify (i.e., dim or brighten) the variable lumen output for at least one LED 114.

In accordance with certain embodiments, at least one LED 114 may comprise a chip-on-board LED. At least one LED 114 may comprise a vertical optical axis relative to a bottom surface of housing 124 (e.g., a chip-on-board LED). Apparatus 100 may further comprise a packing ring 118 configured to interface with a heat sink 116. Apparatus 100 may comprise one or more housing screws 122*a,b* configured to secure electronics assembly 120 and heat sink 116 to housing 124. Apparatus 100 may further comprise a lens assembly comprising a lens 106, a middle lens module 108 and a lower lens module 112. The lens assembly may be housed in the interior portion of housing 124 above at least one LED 114. In certain embodiments, one or more lens module screws 110*a,b* may secure lower lens module 112 to heat sink 116. Apparatus 100 may further comprise a cover portion 104 configured to interface with an upper circumference of housing 124 to securely retain elements 106-120 in the interior portion of housing 124. Cover portion 104 may comprise a glass cover 102 configured to protect the interior portion of housing 124 from dirt, debris, water and other environmental elements. In accordance with certain embodiments, cover portion 104 may be rotatably engaged with lens 106 in order to manipulate one or more beam spread optics of at least one LED 114. In accordance with certain embodiments, lens 106 may be removable/replaceable to enable one or more interchangeable/modifiable beam spread optics for at least one LED 114. In certain embodiments, potentiometer 123 is housed in the interior portion of housing 124. Lens module 112 and heat sink 116 may each contain an aperture configured to expose mechanical interface 127 of potentiometer 123. In accordance with certain aspects of the present disclosure, the user may access mechanical interface 127 of potentiometer 123 upon removing cover portion 104, lens 106 and glass cover 102 from housing 124. The user may selectively adjust potentiometer 123 by inserting a tool, such as a Philips head or flathead screwdriver, through the apertures in lens module 112 and heat sink 116 to turn mechanical interface 127 to a desired position. In accordance with certain aspects of the present disclosure, upon turning mechanical interface 127 the variable resistor component is configured to regulate a flow of power to at least one LED 114 in order to configure the variable lumen output (i.e., brightness) for at least one LED 114. Upon configuring potentiometer 123 to a desired setting (i.e., the desired lumen output), the user may replace cover portion 104, lens 106 and glass cover 102 and position housing 124 to a desired angle/orientation for use.

Figure 4:
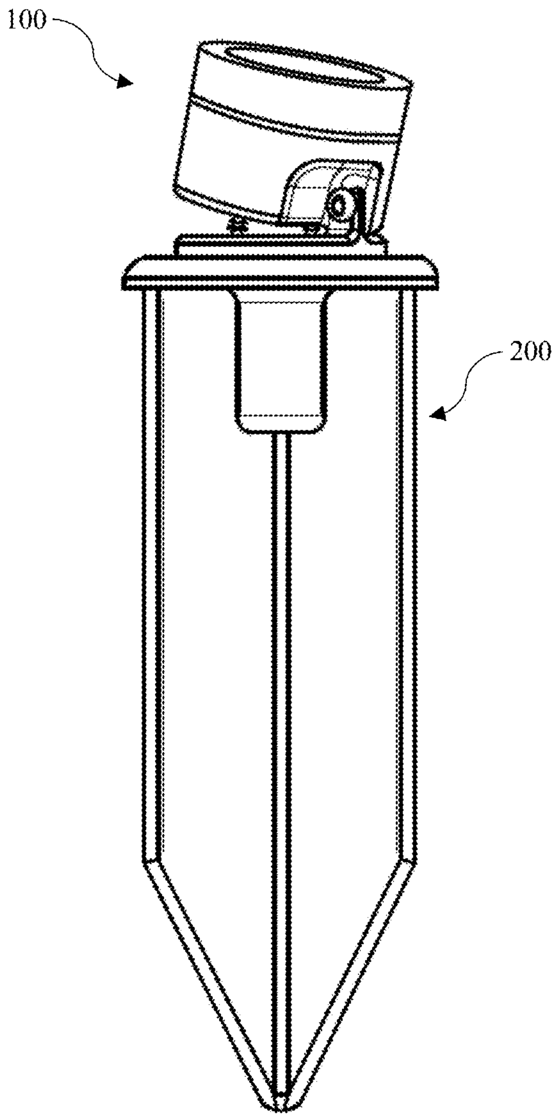
FIG. 4 is a perspective view of the adjustable light emitting apparatus coupled to a garden stake, in accordance with certain aspects of the present disclosure.
Figure 5:
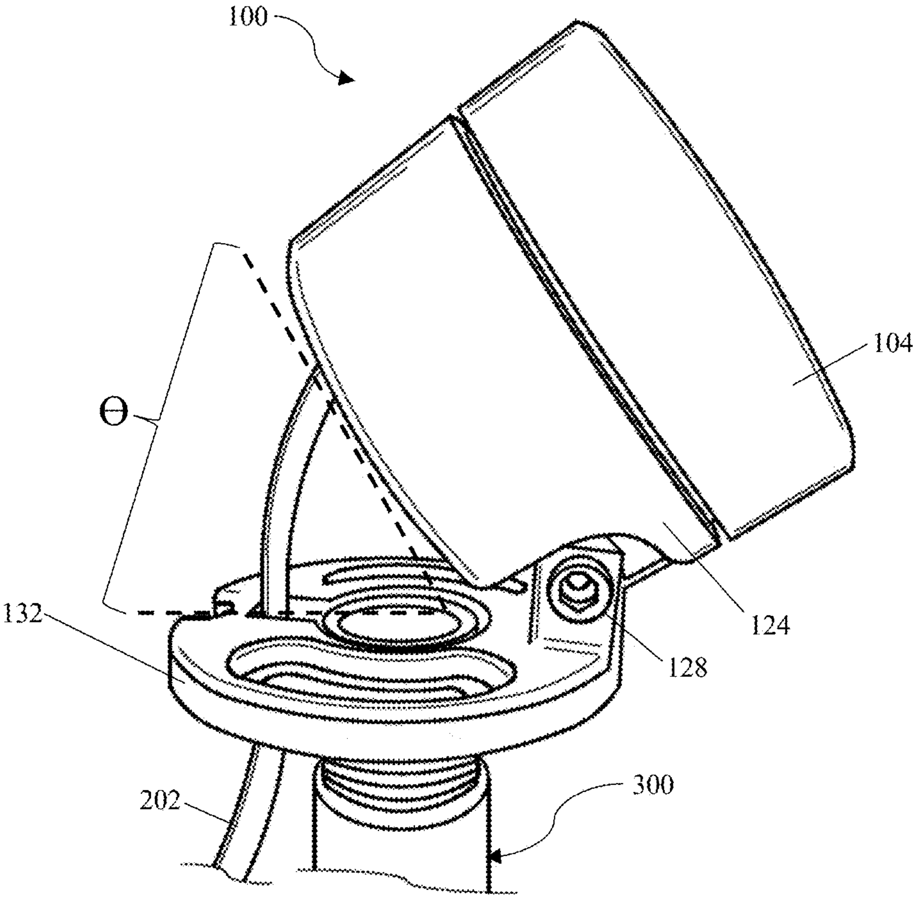
FIG. 5 is a perspective view of the adjustable light emitting apparatus coupled to a garden stake, in accordance with certain aspects of the present disclosure.
Figure 6:
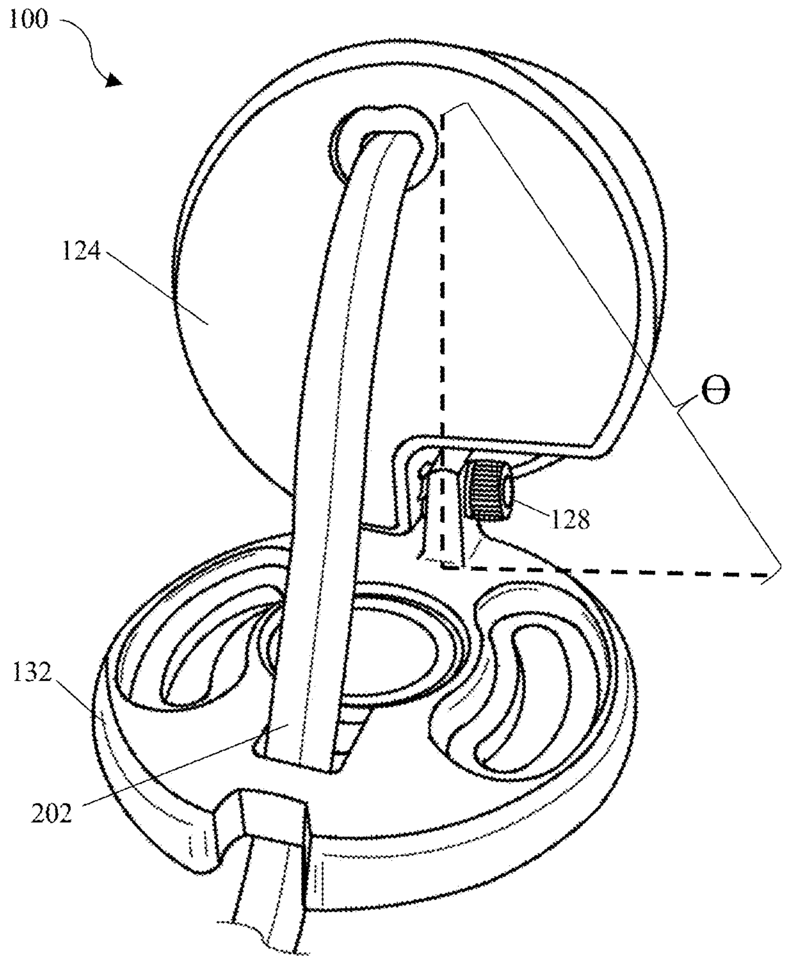
FIG. 6 is a perspective view of the adjustable light emitting apparatus coupled to a garden stake, in accordance with certain aspects of the present disclosure.

Referring now to FIGS. 4-7, perspective views of adjustable light emitting apparatus 100 are shown. In accordance with certain aspects of the present disclosure, apparatus 100 may be selectively interfaced with a garden stake 200, as shown in FIG. 4, in order to selectively install apparatus 100 in a landscape lighting use case. As shown in FIGS. 5 and 6, apparatus 100 may be selectively positioned at an angle Θ relative to base 132 and secured in place via axis screw 128. A power supply cord 202 may extend through an aperture of base 132 and through an opening or port of housing 124 to be operably interfaced with the electronics assembly of apparatus 100 in order to power the at least one LED. As shown in FIG. 5, base 132 may be selectively coupled to an elongated member 300 (e.g., a pole or a spike) in order to enable installation of apparatus 100 in a landscape lighting use case or other outdoor lighting use case.

Figure 7:
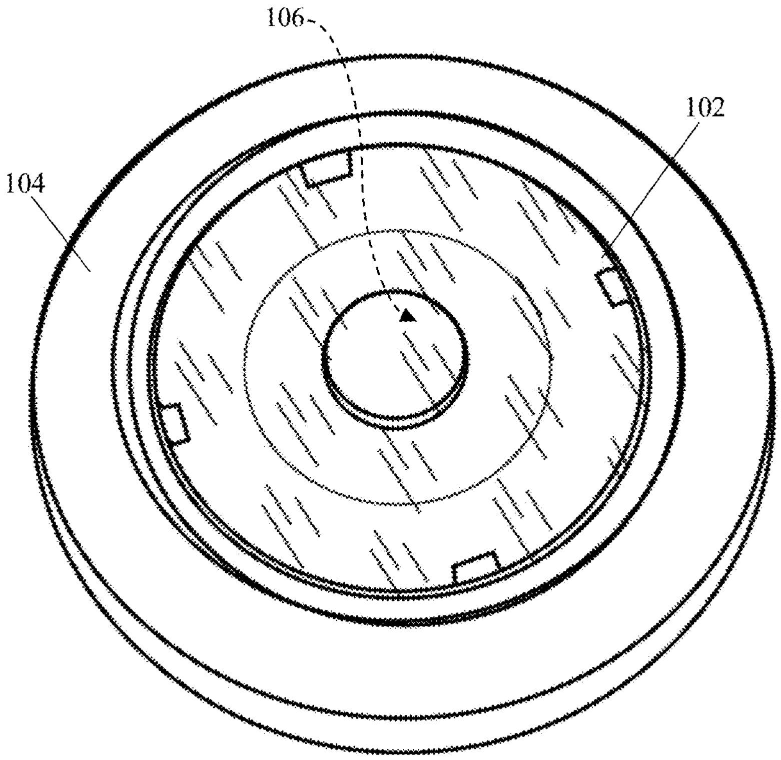
FIG. 7 is a perspective view of the adjustable light emitting apparatus, in accordance with certain aspects of the present disclosure.

In accordance with certain aspects of the present disclosure, an optical axis of a visible light output of apparatus 100 may be positioned along an x-axis and a y-axis. Base 132 may be rotated to a desired position to direct the visible light output of apparatus 100 in a desired direction. Housing 124 may be rotatably positioned along a 180-degree arc by rotating housing 124 around axis screw 128 to a desired position along the x- and y-axis; e.g., at angle Θ. Axis screw 128 may be selectively tightened to retain housing 124 in the desired position; e.g., at angle Θ. As shown in FIG. 7, lens 106 may be positioned to direct/focus the beam spread optics of the visible light output from the at least one LED. In certain embodiments, cover 104 may be twisted to change a position or configuration of lens 106 in order to modify/configure one or more beam spread optics of the visible light output from the at least one LED.

Figure 8A:
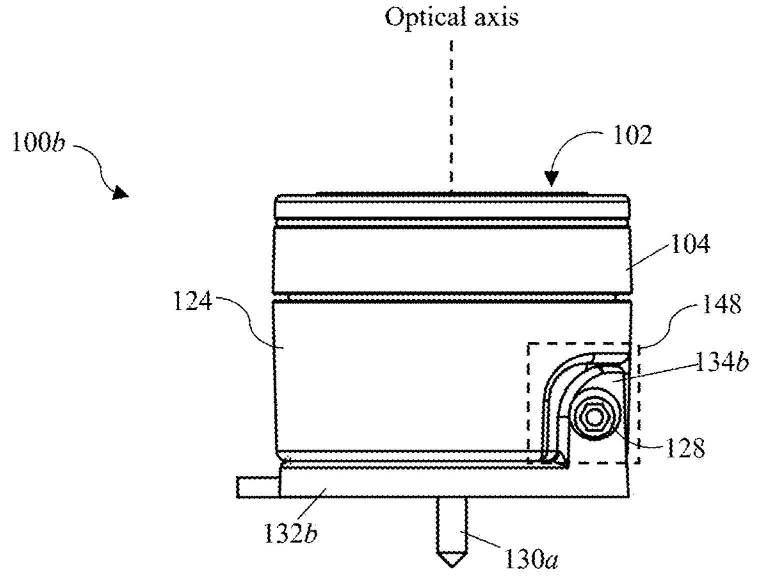
FIGS. 8A-8B are plan views of an adjustable light emitting apparatus, in accordance with certain aspects of the present disclosure.
Figure 8B:
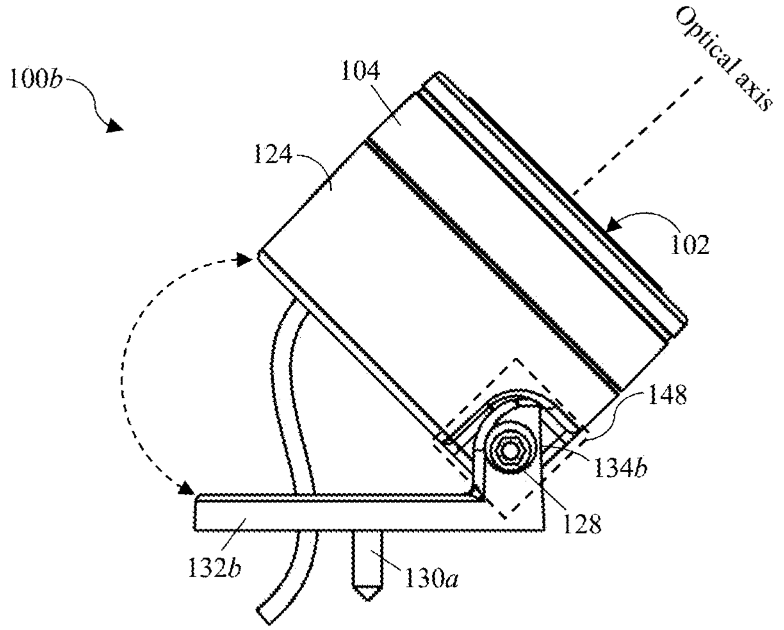

Referring now to FIGS. 8A-8B, plan views of an adjustable light emitting apparatus 100*b* are shown. In accordance with certain aspects of the present disclosure, apparatus 100*b* comprises an alternative embodiment of apparatus 100, as shown in FIGS. 1-7. In accordance with certain embodiments, apparatus 100*b* comprises lens 102, cover portion 104, housing 124, base 132*b*, and axis screw 128. Base screw 130*a* is also shown. Housing 124 comprises recessed portion 148. Recessed portion 148 comprises a recessed area disposed along an arc of the bottom circumference of housing 124 and comprising planar side walls and an upper surface. Recessed portion 148 is configured to receive retaining member 134*b* when base 132*b* and housing 124 are selectively coupled together via axis screw 128. In accordance with certain embodiments, base 132*b* comprises an alternative embodiment to base 132 (as shown in FIG. 2) in that retaining member 134*b* comprises an alternate form factor to retaining member 134 (as shown in FIG. 2). As shown in FIGS. 8A-8B, and shown in further detail in FIG. 9A, retaining member 134*b* comprises a curved upper surface configured to be interfaced with the surface of recessed portion 148. The interface between the curved upper surface of retaining member 134*b* and the surface of recessed portion 148 improves stability and strength between the interface of base 132*b* and housing 124.

As shown in FIG. 8A, apparatus 100*b* comprises an optical axis that is oriented vertically with respect to housing 124. In certain embodiments, apparatus 100*b* comprises a chip-on-board LED to generate a lighting output. Housing 124 may be rotated around retaining member 134*b* to a desired position between 0 degrees (e.g., as shown in FIG. 8A) and 180 degrees. Axis screw 128 may serve as an axis of rotation for housing 124. As shown in FIG. 8B, housing 124 may be rotated around retaining member 134*b* to direct the optical axis of apparatus 100*b* at a desired angle (e.g., according to the lighting application) relative to base 132*b*. Axis screw 128 may be loosened to enable housing 124 to be rotated to a desired position and may be tightened to secure housing 124 to retaining member 134*b* to retain housing 124 in the desired position. As shown in FIG. 8B, housing 124 is positioned at an angle of approximately 45 degrees relative to base 132*b*.

Figure 9A:
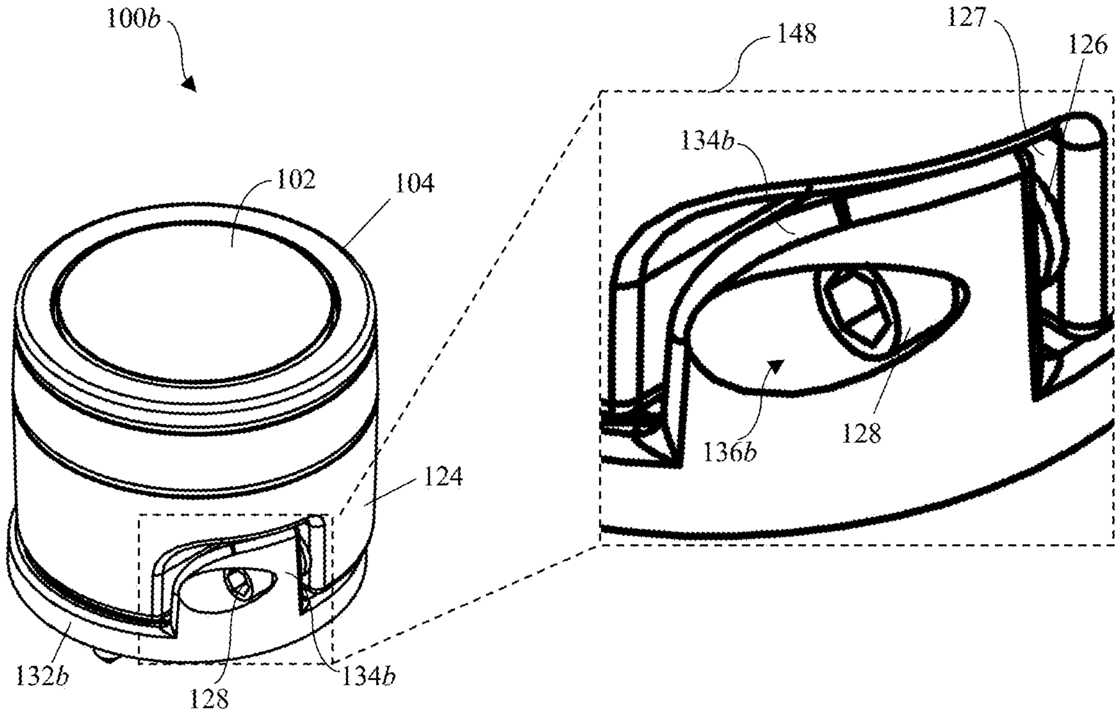
FIGS. 9A-9B are perspective views of an adjustable light emitting apparatus, in accordance with certain aspects of the present disclosure.
Figure 9B:
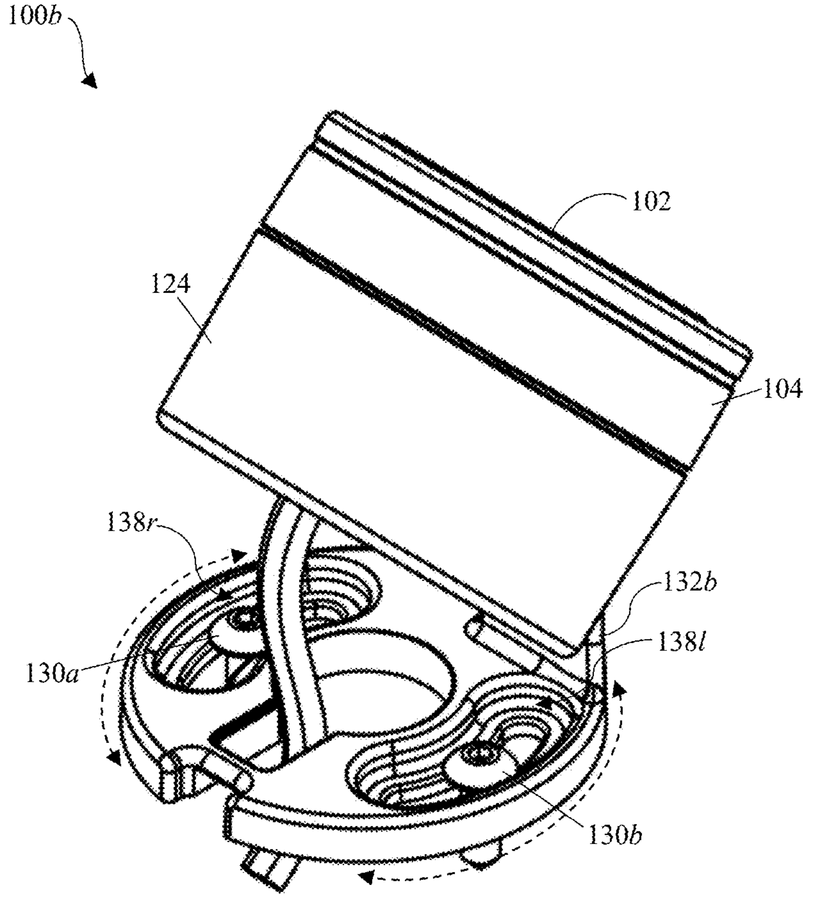

FIGS. 9A-9B are perspective views of adjustable light emitting apparatus 100*b*. FIG. 9A provides a magnified view of retaining member 134*b* and illustrates the interface between retaining member 134*b* and the recessed portion 148 of housing 124. As shown in FIG. 9A, the width of retaining member 134*b* is approximately the same as the width of recessed portion 148. Retaining member 134*b* comprises axis screw aperture 136*b*. Axis screw aperture 136*b* comprises an alternate form factor to axis screw aperture 136 (as shown in FIG. 2) in that axis screw aperture 136*b* comprises an elongated aperture such that the head of axis screw 128 is recessed within axis screw aperture 136*b*. Washer 126 may improve the interface between retaining member 134*b* and side wall 127 and may enhance the interface between axis screw 128 and axis screw aperture 136*b*.

As shown in FIG. 9B, apparatus 100*b* may be securely mounted to a desired substrate (e.g., a wood surface, a metal surface, a concrete surface, etc.) via base screws 130*a,b*. Base screws 130*a,b* may be configured to interface with left base screw channel 138/and right base screw channel 138*r* in order to secure base 132*b* to the desired substrate. Left base screw channel 138/and right base screw channel 138*r* may comprise curved, slotted apertures to enable base 132*b* to be rotated around left base screw channel 138*l* and right base screw channel 138*r* in approximately a 90-degree range of motion (i.e., 45 degrees to the left and 45 degrees to the right). Left base screw channel 138*l* and right base screw channel 138*r* may comprise slotted apertures such that the heads of base screws 130*a,b* are recessed within left base screw channel 138*l* and right base screw channel 138*r* such that a bottom surface of housing 124 may be directly interfaced with an upper surface of base 132*b* in a first configuration (as shown in FIG. 8A).

Figure 10:
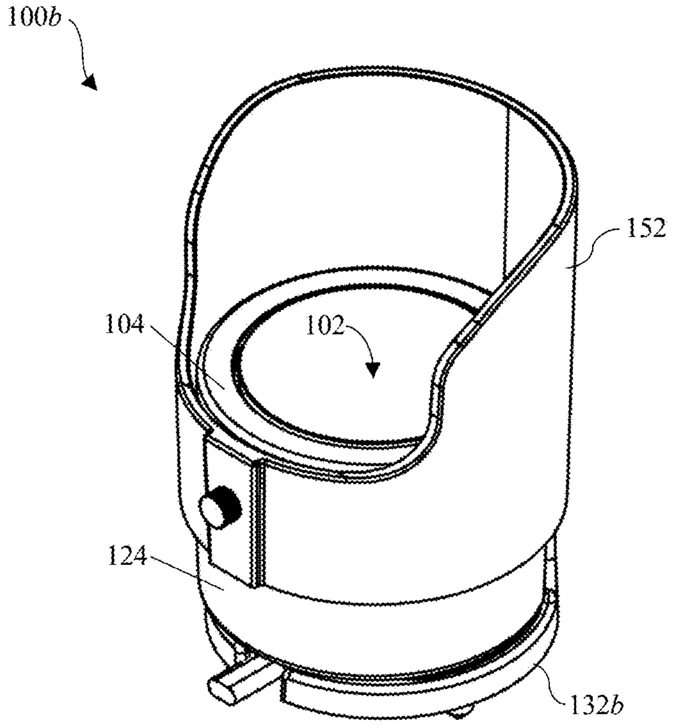
FIG. 10 is a perspective view of the adjustable light emitting apparatus with a removable cowl assembly, in accordance with certain aspects of the present disclosure.

FIG. 10 is a perspective view of adjustable light emitting apparatus 100*b*. In accordance with certain embodiments, apparatus 100*b* may comprise a removable cowl assembly 152 that is friction fit to a circumference of cover portion 104 and housing 124. In accordance with certain aspects of the present disclosure, cowl assembly 152 may be utilized in certain lighting applications to direct the lighting output from apparatus 100*b* in a desired direction and prevent the lighting output from spilling in certain areas/directions.

The terminology used herein is for describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including,", and variants thereof, when used herein, specify the presence of stated features, steps, operations, elements, and/or components, but do not preclude the presence or addition of one or more other features, steps, operations, elements, components, and/or groups thereof. As used herein, "exemplary" means serving as an example or illustration and does not necessarily denote ideal or best.

It will be understood that when an element is referred to as being "coupled," "connected," or "responsive" to another element, it can be directly coupled, connected, or responsive to the other element, or intervening elements may also be present. In contrast, when an element is referred to as being "directly coupled," "directly connected," or "directly responsive" to another element, there are no intervening elements present. As used herein, the term "and/or" includes any and all combinations of one or more of the associated listed items.

Spatially relative terms, such as "above," "below," "upper," "lower," "top, "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

It will be understood that, although the terms "first," "second," etc. may be used herein to describe various elements, these elements should not be limited by these terms. These terms are only used to distinguish one element from another. Thus, a first element could be termed a second element without departing from the teachings of the present embodiments. Unless otherwise defined, all terms (including technical and scientific terms) used herein have the same meaning as commonly understood by one of ordinary skill in the art to which these embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention. Therefore, it will be apparent to those skilled in the art that various modifications and variations can be made to the disclosed embodiments without departing from the scope or spirit of the invention. In view of the foregoing, it is intended that the invention covers modifications and variations of this disclosure within the scope of the following claims and their equivalents.

What is claimed is:

1. A lighting fixture comprising:
a base portion comprising a lower surface defining a perimeter of the base portion, an upper surface and a retaining member;
a housing comprising a bottom surface and a side wall defining an exterior surface and an interior area, the housing comprising a recessed portion,
wherein the base portion and the housing are configured to be selectively interfaced such that the retaining member of the base portion is interfaced with the recessed portion of the housing; and
a retaining means coupled to the base portion and the housing,
wherein the housing is configured to rotate around an axis of the retaining means,
wherein the bottom surface of the housing is in direct contact with the upper surface of the base portion when the housing is positioned at 0 degrees.

2. The lighting fixture of claim 1 further comprising at least one LED housed in the interior area of the housing.

3. The lighting fixture of claim 2 further comprising an electronics assembly housed in the interior area of the housing and operably engaged with the at least one LED.

4. The lighting fixture of claim 3 wherein the electronics assembly further comprises a potentiometer.

5. The lighting fixture of claim 4 wherein the potentiometer is operably configured to control a variable lumen output of the at least one LED.

6. The lighting fixture of claim 5 wherein the potentiometer is selectively configurable by a user to configure the variable lumen output of the at least one LED.

7. The lighting fixture of claim 1 wherein the retaining means is configured to selectively retain the housing to the retaining member at an angle between 0 degrees and at least 90 degrees relative to the upper surface of the base portion.

8. A lighting fixture comprising:
a base portion comprising a lower surface defining a perimeter of the base portion, an upper surface and a retaining member;
a housing comprising a bottom surface and a side wall defining an exterior surface and an interior area, the housing comprising a recessed portion,
wherein the base portion and the housing are configured to be selectively interfaced such that the retaining member is interfaced with the recessed portion of the housing;
an LED lighting assembly housed in the interior area of the housing; and
a retaining means coupled to the base portion and the housing,
wherein the housing is configured to rotate around an axis of the retaining means,
wherein the bottom surface of the housing is in direct contact with the upper surface of the base portion when the housing is positioned at 0 degrees.

9. The lighting fixture of claim 8 wherein the LED lighting assembly further comprises a potentiometer.

10. The lighting fixture of claim 9 wherein the potentiometer is operably configured to control a variable lumen output of at least one LED of the LED lighting assembly.

11. The lighting fixture of claim 10 wherein the potentiometer is selectively configurable by a user to configure the variable lumen output of the at least one LED.

12. The lighting fixture of claim 9 wherein the retaining means is configured to selectively retain the housing to the retaining member at an angle between 0 degrees and at least 90 degrees relative to the upper surface of the base portion.

13. The lighting fixture of claim 11 wherein the potentiometer further comprises a mechanical interface configured to enable the user to configure the variable lumen output of the at least one LED.

14. The lighting fixture of claim 8 wherein the first planar surface of the retaining member is oriented perpendicularly to the upper surface of the base portion.

15. A lighting fixture comprising:
a base portion comprising a lower surface defining a perimeter of the base portion, an upper surface and a retaining member;
a housing comprising a bottom surface and a side wall defining an exterior surface and an interior area, the housing comprising a recessed portion,
wherein the base portion and the housing are configured to be selectively interfaced such that the retaining member is interfaced with the recessed portion of the housing;
a retaining means coupled to the base portion and the housing,
wherein the housing is configured to rotate around an axis of the retaining means,
wherein the bottom surface of the housing is in direct contact with the upper surface of the base portion when the housing is positioned at 0 degrees; and
at least one light source housed in the interior area of the housing.

16. The lighting fixture of claim 15 further comprising an electronics assembly housed in the interior area of the housing and operably engaged with the at least one light source, the electronics assembly comprising a driver configured to provide a flow of power between a power supply and the at least one light source.

17. The lighting fixture of claim 16 wherein the electronics assembly further comprises a potentiometer.

18. The lighting fixture of claim 17 wherein the potentiometer is selectively configurable by a user to configure the variable lumen output of the at least one light source.

19. The lighting fixture of claim 18 wherein the potentiometer further comprises a mechanical interface configured to enable the user to configure the variable lumen output of the at least one light source.

20. The lighting fixture of claim 15 wherein the retaining means is configured to selectively secure the housing to the base portion at an angle between 0 degrees and at least 90 degrees relative to the upper surface of the base portion.

* * * * *